(12) United States Patent
Chen

(10) Patent No.: US 8,410,219 B2
(45) Date of Patent: Apr. 2, 2013

(54) METHOD FOR INCREASING MELT FLOW OF A BIMODAL IONOMER COMPOSITION

(75) Inventor: John Chu Chen, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 587 days.

(21) Appl. No.: 12/644,175

(22) Filed: Dec. 22, 2009

(65) Prior Publication Data

US 2011/0152007 A1    Jun. 23, 2011

(51) Int. Cl.
C08L 23/26 (2006.01)
C08L 33/02 (2006.01)
C08L 33/06 (2006.01)

(52) U.S. Cl. ..... 525/221; 525/222; 525/240; 525/330.2; 525/330.3

(58) Field of Classification Search ............... 525/327, 525/221, 222, 240, 330.2, 330.3; 523/201
See application file for complete search history.

(56) References Cited

U.S. PATENT DOCUMENTS

| | | |
|---|---|---|
| 3,264,272 A | 8/1966 | Rees |
| 4,690,981 A | 9/1987 | Statz |
| 5,028,674 A | 7/1991 | Hatch et al. |
| 5,567,772 A | 10/1996 | Hagman et al. |
| 5,587,430 A | 12/1996 | Talkowski |
| 5,691,418 A | 11/1997 | Hagman et al. |
| 5,929,174 A | 7/1999 | Permentier et al. |
| 5,973,046 A | 10/1999 | Chen et al. |
| 6,100,321 A | 8/2000 | Chen |
| 6,100,340 A | 8/2000 | Rajagopalan et al. |
| 6,130,294 A | 10/2000 | Ichikawa et al. |
| 6,197,884 B1 | 3/2001 | Rajagopalan et al. |
| 6,562,906 B2 | 5/2003 | Chen |
| 6,762,246 B2 | 7/2004 | Chen |
| 7,037,967 B2 | 5/2006 | Chen |
| 7,273,903 B2 | 9/2007 | Chen |
| 7,488,778 B2 | 2/2009 | Chen |
| 7,939,602 B2 | 5/2011 | Morken et al. |
| 2002/0037968 A1 | 3/2002 | Chen |
| 2003/0125480 A1 | 7/2003 | Sullivan et al. |
| 2003/0158312 A1 | 8/2003 | Chen |
| 2004/0116211 A1 | 6/2004 | Sullivan et al. |
| 2004/0132552 A1 | 7/2004 | Chen |
| 2004/0209705 A1 | 10/2004 | Rajagopalan et al. |
| 2005/0203253 A1 | 9/2005 | Chou et al. |
| 2007/0203277 A1 | 8/2007 | Chen |
| 2009/0082507 A1* | 3/2009 | Egashira et al. .............. 524/425 |
| 2009/0118040 A1 | 5/2009 | De Garavilla |
| 2009/0130355 A1 | 5/2009 | Chen et al. |
| 2009/0182089 A1 | 7/2009 | Chen |
| 2009/0325733 A1 | 12/2009 | Morken et al. |

* cited by examiner

Primary Examiner — Kelechi Egwim

(57) ABSTRACT

Provided is a method for increasing the melt flow of a composition comprising a mixture of high molecular weight carboxylate functionalized ethylene copolymers (Mw between 80,000 and 500,000 Da) with low molecular weight carboxylate functionalized ethylene copolymers (Mw between 2,000 and 30,000 Da), wherein the carboxylic acid groups are at least partially neutralized to form salts containing zinc cations. The method comprises melt mixing the composition with ionomers containing cations other than zinc. Also disclosed are trimodal compositions comprising high molecular weight terpolymers, high molecular weight dipolymers and low molecular weight dipolymers wherein the carboxylic acid groups are at least partially neutralized to salts containing zinc cations and non-zinc cations. The compositions are used in films, multilayer structures and other articles of manufacture.

10 Claims, No Drawings

METHOD FOR INCREASING MELT FLOW OF A BIMODAL IONOMER COMPOSITION

BACKGROUND OF THE INVENTION

1. Field of the Invention

The invention relates to a method for increasing melt flow of bimodal ionomers. This invention also relates to trimodal ionomer compositions.

2. Description of Related Art

Thermoplastic polymers are commonly used to manufacture various shaped articles which may be utilized in applications such as automotive parts, food containers, signs, and packaging materials. Shaped articles comprising ionomers may be prepared from the molten polymer by a number of melt extrusion processes known in the art, such as injection molding, compression molding, blow molding, and profile extrusion.

Increasing melt flow, for example as measured by melt index (MI), may be important to melt processing of the ionomers for injection molding and thin-gauge coating applications. Lowering the neutralization or raising the base acid copolymer MI may provide higher melt flow for the ionomer, but this may compromise the performance of the material after it is formed into solid articles. For example, stiffness, toughness, scratch and scuff resistance, and melt strength may be affected.

Some strategies for increasing the melt index of ionomers have been described. For example, U.S. Pat. No. 5,929,174 describes neutralized ethylene acrylic acid copolymers that comprise a combination of divalent and monovalent cations and that exhibit melt index uplift. It is reported that ethylene methacrylic acid copolymers do not exhibit melt index uplift.

Bimodal ionomer compositions and their use in golf balls are described in U.S. Pat. Nos. 6,562,906; 6,762,246; 7,037,967 7,273,903 and 7,488,778 and U.S. patent application Ser. No. 12/315,731. The bimodal ionomers may also be used as scratch and scuff-resistant surface layers of a variety of articles (US Patent Appln. Publn. No. 2009/0130355). The bimodal ionomer compositions comprise an ethylene α,β-ethylenically unsaturated $C_{3-8}$ carboxylic acid copolymer having weight average molecular weight (Mw) of about 80,000 to about 500,000 Da (high molecular weight copolymer) and an ethylene α,β-ethylenically unsaturated $C_{3-8}$ carboxylic acid copolymer having (Mw) of about 2,000 to about 30,000 Da (low molecular weight copolymer).

It is desirable to increase the melt flow of bimodal ionomers while retaining good physical and mechanical properties for the solid material.

SUMMARY OF THE INVENTION

Described herein is a method for increasing the melt index of a first ionomer composition or a second ionomer composition, the method comprising melt mixing the first ionomer composition with the second ionomer composition to provide a third ionomer composition; wherein the third ionomer composition has a melt index that is greater than expected; and wherein the first ionomer composition comprises, consists essentially of, or is prepared from (i) 70 to 95 weight %, based on the total weight of (i) and (ii), of an E/X/Y terpolymer wherein E represents copolymerized units of ethylene, X represents copolymerized units of a $C_3$ to $C_8$ α,β-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da; and (ii) 5 to 30 weight %, based on the total weight of (i) and (ii), of an E/Z copolymer wherein E represents copolymerized units of ethylene and Z represents copolymerized units of acrylic acid or methacrylic acid, wherein the amount of Z is about 3 to about 25 weight % of the E/Z copolymer and wherein the Mw of the E/Z copolymer is in the range of 2,000 to 30,000 Da; wherein at least 30% of the combined carboxylic acid groups in the E/X/Y terpolymer and the E/Z copolymer are nominally neutralized to carboxylate salts of a first element;

and the second ionomer composition comprises an E/W dipolymer wherein E represents copolymerized units of ethylene and W represents copolymerized units of acrylic acid or methacrylic acid, wherein the amount of W is about 2 to about 30 weight % of the E/W dipolymer, and wherein the Mw of the E/W dipolymer is in the range of 80,000 to 500,000 Da, wherein at least 35% of the carboxylic acid groups in the E/W dipolymer are nominally neutralized to carboxylate salts with cations of an element other than the first element;

and the third ionomer composition comprises 5 to 75 weight % of the second ionomer composition, based on the total weight of (i), (ii) and second ionomer, wherein the combination of carboxylate salts comprises zinc and at least one element selected from the group consisting of group IA elements and group IIA elements; provided that when X represents copolymerized units of acrylic acid and W represents copolymerized units of methacrylic acid in an amount greater than 12 weight % of the E/W copolymer, the combination of carboxylate salts comprises zinc and at least one element selected from the group consisting of a group IA element other than sodium and a group IIA element other than magnesium;

wherein the expected MI is calculated using the formula $$\mathrm{Log(MI}_{expected})=W_1\times\mathrm{Log(MI}_1)+W_2\times\mathrm{Log(MI}_2)$$

wherein $W_1$ is the decimal fraction (by weight) of the first ionomer composition and $MI_1$ is the melt index of the first ionomer composition, and $W_2$ is the decimal fraction (by weight) of the second ionomer composition and $MI_2$ is the melt index of the second ionomer composition in the blend.

In one method of note, the third ionomer composition has a melt index that is greater than the melt index of the first ionomer composition and greater than the melt index of the second ionomer composition.

Also of note are the method wherein the first ionomer composition is neutralized with zinc and the method wherein the second ionomer composition is neutralized with zinc.

This invention also provides a composition comprising, consisting essentially of, or prepared from (a) 20 to 80 weight %, based on the combination of (a), (b) and (c), of an E/X/Y terpolymer wherein E represents copolymerized units of ethylene, X represents copolymerized units of a $C_3$ to $C_8$ α,β-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da;

(b) 5 to 75 weight %, based on the combination of (a), (b) and (c), of an E/W dipolymer wherein E represents copolymerized units of ethylene and W represents copolymerized units of acrylic acid or methacrylic acid, wherein the amount of W is about 3 to about 25 weight % of the E/W dipolymer and wherein the weight average molecular weight (Mw) of the E/W dipolymer is in the range of 80,000 to 500,000 Da; and (c) 2 to 20 weight %, based on the combination of (a), (b) and (c), of an E/Z copolymers wherein E represents copolymerized units of ethylene and Z represents copolymerized units of acrylic acid or methacrylic acid, wherein the amount of Z is about 3 to about 25 weight % of the E/Z copolymer and wherein the weight average molecular weight (Mw) of the E/Z dipolymer is in the range of 2,000 to 30,000 Da; wherein at least 35% of the combined acidic groups in the E/X/Y terpolymer, the E/W dipolymer and the E/Z dipolymer are nominally neutralized to carboxylate salts comprising a combination of zinc cations and cations of one or more elements selected from the group consisting of group IA elements and group IIA elements; provided that when X represents copolymerized units of acrylic acid and W represents copolymerized units of methacrylic acid, in an amount greater than 12 weight % of the E/W copolymer, the group IA element is other than sodium and the group IIA element is other than magnesium.

This invention also provides articles prepared using the method or prepared from the composition described above.

DETAILED DESCRIPTION OF THE INVENTION

Several patents and publications are cited in this description in order to more fully describe the state of the art to which this invention pertains. All references identified throughout this Specification including those in the Description of Related Art are incorporated by reference as if fully set forth herein.

The following definitions apply to terms used in this specification, unless otherwise limited in specific instances. The technical and scientific terms used herein have the meanings that are commonly understood by one of ordinary skill in the art to which this invention belongs. In case of conflict, the present specification, including the definitions herein, will control. Tradenames are printed in uppercase lettering.

As used herein, the terms "comprises," "comprising," "includes," "including," "containing," "characterized by," "has," "having" or any other variation thereof, refer to a non-exclusive inclusion. For example, a process, method, article, or apparatus that comprises a given list of elements is not necessarily limited to only those elements given, but may further include other elements not expressly listed or inherent to such process, method, article, or apparatus.

The transitional phrase "consisting of" excludes any element, step, or ingredient not specified in the given list of elements, closing the list to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at levels that are appropriate for such additives, and minor impurities are not excluded from a composition by the term "consisting essentially of".

The basic and novel characteristics of this invention are methods for preparing compositions with melt indices that are greater than expected from a weighted average of the melt indices of the individual components, and compositions having melt indices greater than expected from a weighted average of the melt indices of the individual components.

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The ranges set forth herein include their endpoints unless expressly stated otherwise. When an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 9 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "dipolymer" refers to polymers consisting essentially of two monomers and the term "terpolymer" refers to polymers consisting essentially of three monomers.

The term "Mw" means weight average molecular weight and the term "Mn" means number average molecular weight. The terms "low molecular weight copolymer" or "low molecular weight dipolymer" as used herein refer to polymers that have a molecular weight (Mw) in the range of 2,000 to 30,000 Da. The terms "high molecular weight copolymer" "high molecular weight terpolymer", and "high molecular weight dipolymer" as used herein refer to polymers that have a higher molecular weight (Mw) in the range of 80,000 to 500,000 Da. "Bimodal ionomer" or "BMI" refers to a mixture of a high molecular weight copolymer and a low molecular weight copolymer wherein the Mw of the high molecular weight copolymer and the Mw of the low molecular weight copolymer are sufficiently different such that two distinct molecular weight peaks are observed when measuring the Mw of the blend by gel permeation chromatography (GPC) with a high resolution column, wherein the combined acid moieties of the high molecular weight copolymer and the low molecular weight copolymer are at least partially neutralized to form carboxylate salts with zinc cations.

The term "trimodal ionomer" as used herein refers to a mixture of a high molecular weight terpolymer, a high molecular weight dipolymer and a low molecular weight dipolymer in which at least a portion of the combined carboxylate groups are neutralized to salts. A "mixed ion trimodal ionomer" is a trimodal ionomer comprising a mixture of zinc cations and cations of group IA or group IIA elements such as lithium, sodium, or magnesium cations. Importantly, the molecular weights (Mw) of the high molecular weight dipolymer and the high molecular weight terpolymer in the trimodal compositions may be the same or different. Also significantly, the comonomer compositions of the high and low molecular weight copolymers in each bimodal or trimodal composition may be the same or different.

The term "melt index" or "MI" refers to melt index as determined according to ASTM D1238 at 190° C. using a 2160 g weight, with values of MI reported in g/10 minutes, unless otherwise specified.

In abbreviated descriptions of copolymers, "E" represents copolymerized ethylene, "MAA" represents copolymerized methacrylic acid, "AA" represents copolymerized acrylic acid and "nBA" represents copolymerized n-butyl acrylate. Any numbers in the abbreviated descriptions indicate the weight % of the copolymerized comonomer present in the copolymer. For example, "E/9MAA/23.5nBA" refers to a terpolymer comprising 9 wt % of copolymerized residues of methacrylic acid, 23.5 wt % of copolymerized residues of n-butyl acrylate, and the remainder (100 wt %-23.5 wt %-9 wt %=67.5 wt %) of copolymerized residues of ethylene.

Bimodal ionomer compositions are useful as thermoplastic compositions for molding applications. By proper selection of the components and neutralizing counterions, addition of another ionomer to a bimodal ionomer composition increases the melt flow (melt index) of the resulting trimodal ionomer compared to the original bimodal ionomer composition or to the other ionomer. For example, the mixed ion trimodal ionomer composition described herein has a higher melt index compared to a similar bimodal ionomer composition consisting essentially of the corresponding high molecular weight acid terpolymer and low molecular weight acid copolymer that contains carboxylate salts with cations from a single element. It may also have a higher melt index than the high molecular weight acid dipolymer that is the other ionomer. In addition, the mixed ion trimodal ionomer composition also has a higher melt index compared to a similar ionomer composition consisting essentially of the corresponding high molecular weight acid terpolymer, high molecular weight acid dipolymer and low molecular weight acid copolymer containing carboxylate salts with cations of a single element.

In particular, blending a zinc-containing bimodal ionomer (e.g., a mixture of an E/AA/nBA high molecular weight terpolymer and an E/AA low molecular weight copolymer, the composition having zinc carboxylate salts) with an E/MAA high molecular weight dipolymer ionomer with Li, Na, or Mg carboxylate salts, provides an unexpected MI increase compared to the reference bimodal ionomer blended with a zinc-containing E/MAA ionomer, for which no unusual MI rise is observed. Surprisingly, the MI of the mixed-ion blend (a mixed ion trimodal ionomer) may be higher than either that of the original zinc-containing bimodal ionomer or the Li, Na, or Mg-containing dipolymer.

More specifically, the melt index of the trimodal ionomer composition is surprisingly and significantly increased with respect to its predicted value. The MI that one would expect of the trimodal ionomer composition may be calculated using the weighted model of formula (I):

$$\text{Log}(\text{MI}_{expected}) = W_1 \times \text{Log}(\text{MI}_1) + W_2 \times \text{Log}(\text{MI}_2) \tag{I}$$

wherein $W_1$ is the decimal fraction (by weight) of the first ionomer composition and $MI_1$ is the melt index of the first ionomer composition, and wherein $W_2$ is the decimal fraction (by weight) of the second ionomer composition and $MI_2$ is the melt index of the second ionomer composition. The actual, measured MI of the trimodal ionomer composition is increased by a factor of at least 1.5, at least 2.0, at least 2.5, at least 3.0, or at least 4.0, compared to $MI_{expected}$ as calculated by formula (I).

Should one or more other ionomeric components be present in the trimodal composition, it is believed that the same effect would be observed, provided that the additional ionomeric components are high molecular weight acid copolymers or bimodal compositions comprising a high molecular weight acid terpolymer and a low molecular weight acid dipolymer. In particular, it is believed that the actual, measured MI of a trimodal ionomer composition further comprising additional ionomeric component, or a total of 3 to n ionomeric components, wherein n is an integer, would be increased significantly with respect to $MI_{expected}$ as calculated by formula (II):

$$\text{Log}(MI_{expected}) = W_1 \times \text{Log}(MI_1) + W_2 \times \text{Log}(MI_2) + W_3 \times \text{Log}(MI_3) + \ldots + W_X \times \text{Log}(MI_X) + \ldots + W_n \times \text{Log}(MI_n) \quad \text{(II)}$$

wherein $W_1$, $MI_1$, $W_2$ and $MI_2$ are as defined above, wherein $W_3$ is the decimal fraction (by weight) of the third ionomeric component and $MI_3$ is its melt index, wherein $W_X$ is the decimal fraction (by weight) of the xth ionomeric component and $MI_X$ is its melt index (for integers x such that 3<x<n), and wherein $W_n$ is the decimal fraction (by weight) of the nth ionomeric component and $MI_n$ is its melt index. Apparently, if there is no xth or nth component, the corresponding terms $W_X$, $MI_X$, $W_n$ or $MI_n$ are not used in formula (II). Stated alternatively, the higher order terms $W_X \times \text{Log}(MI_X)$ and $W_n \times \text{Log}(MI_n)$ may equal zero, when n is 3 or 4. The additional ionomeric components may be any of the high molecular weight dipolymers or bimodal compositions that are described in greater detail below.

High Molecular Weight Copolymers

The high molecular weight copolymer components of the bimodal and trimodal ionomer compositions are preferably 'direct' acid copolymers or random acid copolymers, in which the comonomers are copolymerized to form a polymer backbone, as opposed to grafted copolymers in which a comonomer is added onto an existing polymer backbone. The high molecular weight copolymers preferably have a molecular weight (Mw) of about 80,000 to about 500,000 Da. Preferably, they have a polydispersity (Mw/Mn) of about 1 to about 15, more preferably about 1 to about 10.

The high molecular weight copolymers are copolymers of an α-olefin, preferably ethylene, with an α,β-ethylenically unsaturated carboxylic acid, preferably acrylic acid or methacrylic acid, optionally containing a third softening monomer. "Softening" means that the inclusion of the comonomer lowers the crystallinity of the terpolymer, compared to that of an acid-only copolymer.

Thus, these high molecular weight terpolymers may be described as E/X/Y terpolymers wherein E represents copolymerized units of ethylene, X represents copolymerized units of a $C_{3-8}$ α,β-ethylenically unsaturated carboxylic acid, and Y represents copolymerized units of a softening comonomer selected from alkyl acrylate and alkyl methacrylate, wherein the alkyl groups have from 1 to 8 carbon atoms, and vinyl acetate.

X is present in an amount of about 2 to about 30 (or about 2 to 25 or about 2 to 20, preferably 5 to 25, more preferably 5 to 20, or 5 to 10) weight %, based on the total weight of the E/X/Y polymer. Y is present in an amount of from 3 to 45 weight %, preferably from a lower limit of 3 or 5 or more preferably 10, to an upper limit of 25, 30 or 45 weight %, again based on the total weight of the E/X/Y terpolymer. Of note are E/X/Y terpolymers in which X represents copolymerized units of acrylic acid and Y represents copolymerized units of an alkyl acrylate. Suitable terpolymers include without limitation ethylene/acrylic acid/methyl acrylate, ethylene/acrylic acid/ethyl acrylate, ethylene/acrylic acid/n-butyl acrylate, ethylene/acrylic acid/iso-butyl acrylate. Preferred terpolymers include ethylene/acrylic acid/n-butyl acrylate terpolymers.

Also of note are E/X/Y terpolymers in which X represents copolymerized units of methacrylic acid and Y represents copolymerized units of an alkyl acrylate. These terpolymers include without limitation ethylene/methacrylic acid/methyl acrylate, ethylene/methacrylic acid/ethyl acrylate, ethylene/methacrylic acid/n-butyl acrylate, and ethylene/methacrylic acid/iso-butyl acrylate, notably ethylene/methacrylic acid/n-butyl acrylate terpolymers.

The high molecular weight dipolymers may be described as E/W dipolymers, including without limitation, ethylene/acrylic acid dipolymers and preferably ethylene/methacrylic acid dipolymers. W is present in an amount of about 2 to about 30, preferably 3 to about 25, 5 to 25, or 8 to 20 weight %, based on the total weight of the E/W dipolymer. Of note are low-acid E/W dipolymers (12 weight % or less of copolymerized methacrylic acid) and high-acid E/W dipolymers (greater than 12 weight % of copolymerized methacrylic acid).

The high molecular weight polymers preferably have melt indices (MI) from about 0.1 to about 600, or from about 25 to about 300, or from about 60 to about 250 g/10 min.

Methods of preparing ethylene acid copolymers, such as E/X/Y and E/W, are known. For example, ethylene acid copolymers may be prepared in continuous polymerizers by use of "co-solvent technology" as described in U.S. Pat. No. 5,028,674.

Examples of suitable high molecular weight copolymers and their molecular weights are shown in Table A. "NA" means not available. HC-1 through HC-7 are examples of E/X/Y terpolymers and HC-8 through HC-17 are examples of E/W dipolymers.

TABLE A

| | Polymer Composition | MI | Mn ($10^3$) | Mw ($10^3$) | Polydispersity (Mw/Mn) |
|---|---|---|---|---|---|
| HC-1 | E/9MAA/23.5nBA | 25 | 26.6 | 176.5 | 6.6 |
| HC-2 | E/8.3AA/17nBA | NA | NA | NA | NA |
| HC-3 | E/6.2AA/28nBA | 200 | NA | NA | NA |
| HC-4 | E/10.5AA/15.5nBA | 60 | NA | NA | NA |
| HC-5 | E/8.5AA/15.5nBA | 60 | NA | NA | NA |
| HC-6 | E/10MAA/17nBA | 25 | NA | NA | NA |
| HC-7 | E/15AA/35nBA | 200 | NA | NA | NA |
| HC-8 | E/15MAA | 60 | 17.6 | 112.4 | 6.4 |
| HC-9 | E/4MAA | 3 | 31.7 | 365.5 | 11.5 |
| HC-10 | E/9MAA | 2.5 | NA | NA | NA |
| HC-11 | E/10MAA | 450 | NA | NA | NA |
| HC-12 | E/10MAA | 500 | 16.0 | 84.0 | 5.3 |
| HC-13 | E/10MAA | 35 | 19.6 | 160.8 | 8.2 |
| HC-14 | E/19MAA | 60 | NA | NA | NA |
| HC-15 | E/11MAA | 95 | NA | NA | NA |
| HC-16 | E/15MAA | 220 | NA | NA | NA |
| HC-17 | E/8.7MAA | 10 | NA | NA | NA |

Low Molecular Weight Copolymers

The low molecular weight copolymers are preferably 'direct' acid copolymers or random acid copolymers having a molecular weight (Mw) of about 2,000 to about 30,000 Da. Preferably they have polydispersities (Mw/Mn) of about 1 to about 10, more preferably about 1 to about 6. They are copolymers of an α-olefin, preferably ethylene, with a $C_{3-8}$ α,β-ethylenically unsaturated carboxylic acid, preferably acrylic or methacrylic acid. Also preferably, the amount of copolymerized acid residues in these copolymers is about 3 to about 30 (or 5 to 20, or 3 to 15, most preferably 5 to 10) weight %, based on the total weight of the low molecular weight copolymer. When the α-olefin is ethylene, the low molecular weight acid copolymers may be referred to as "E/Z" copolymers. In this abbreviation, E once more represents copolymerized residues of ethylene, and Z represents copolymerized residues of the α,β-ethylenically unsaturated carboxylic acid.

These low molecular weight copolymers may also be referred to as acid waxes. Suitable examples are commercially available from Honeywell Specialty Wax and Additives of Morristown, N.J. (e.g., AC 540, believed to be an ethylene/5 weight % acrylic acid copolymer with a number average molecular weight of 4369, and others indicated in Table B with their molecular weights).

These low molecular weight polymers are typically too low in viscosity at elevated temperatures to have a meaningful or measurable melt index. Instead, their Mw may be correlated to their Brookfield viscosity. This technique for measuring viscosity of fluids is outlined in, for example, ASTM D2196, D2983 or D3236-1978. The Brookfield viscosity is reported in centipoise and the value is determined by the type of spindle and the spindle speed or shear rate at which the Brookfield Viscometer is operated. Brookfield Viscosity data (measured at 140° C.) in Table B were provided by Honeywell or by its predecessor, the Allied Signal Corporation.

TABLE B

| Trade Designation | Composition | Brookfield Viscosity (cps) | Mn ($10^3$) | Mw ($10^3$) | Polydispersity (Mw/Mn) |
| --- | --- | --- | --- | --- | --- |
| LC-1 | AC143 | E/17AA | NA | NA | 2.04 | NA |
| LC-2 | AC540 | E/5AA | 575 | 4.3 | 7.5 | 1.7 |
| LC-3 | AC580 | E/10AA | 650 | 4.8 | 26.0 | 5.4 |
| LC-4 | AC5120 | E/15AA | 650 | 3.0 | 5.2 | 1.7 |

Preferably the Mw of the high molecular weight copolymers is separated from the Mw of the low molecular weight copolymers sufficiently that the peaks for the high molecular weight copolymers are distinctly separated from the peaks for the low molecular weight copolymers when the molecular weight distribution of the mixture is determined by GPC with a high resolution column. Preferably, high molecular weight copolymers with lower Mw are blended with low molecular weight copolymers with lower Mw (e.g. high molecular weight copolymers with Mw of 80,000 Da with low molecular weight copolymers with Mw of 2,000 Da). This preference becomes less important as the Mw of the high molecular weight copolymer increases.

Ionomers

Ionomers are acid copolymers in which at least some of the carboxylic acid groups in the copolymer are neutralized to form the corresponding carboxylate salts. Ionomers may be prepared from the high and low molecular weight acid copolymers described above, wherein the carboxylic acid groups present are at least partially neutralized by basic compounds to form salts comprising alkali metal ions, transition metal ions, alkaline earth metal ions, other metal ions or combinations of cations. Methods for preparing ionomers are described in U.S. Pat. No. 3,264,272.

Compounds suitable for neutralizing the acid copolymer include any base of appropriate pKa that is stable under processing conditions. Preferred are ionic compounds having basic anions and alkali metal (group IA) cations (for example, lithium, sodium or potassium ions), alkaline earth (group IIA) metal cations (for example magnesium or calcium ions), transition metal cations (for example silver or copper ions), cations of other metals (for example tin or zinc cations) and mixtures or combinations of such cations.

Ionic compounds that may be used for neutralizing the ethylene acid copolymers include metal formates, acetates, nitrates, carbonates, hydrogen carbonates, oxides, hydroxides or alkoxides. The amount of ionic compound capable of neutralizing a certain number of acidic groups (referred to herein as "% nominal neutralization" or "nominally neutralized") may be determined by simple stoichiometric principles. When an amount of base sufficient to neutralize a target amount of acid moieties in the acid copolymer is made available in a melt blend, it is assumed that, in aggregate, the indicated level of nominal neutralization is achieved.

Ionomers of the high molecular weight copolymers and of the low molecular weight copolymers when made separately may be made by methods described above. The degree of neutralization and the acid level preferably are such that the resulting ionomers of the high and low molecular weight copolymers are melt processible. Examples of suitable ionomers prepared from high molecular weight copolymers include those listed in Table C.

TABLE C

| Ionomer | Acid copolymer | Nominal Neutralization (%) | Cation | MI |
| --- | --- | --- | --- | --- |
| I-1 | HC-1 | 51 | Mg | 1.1 |
| I-2 | HC-14 | 37 | Na | 2.6 |
| I-3 | HC-8 | 58 | Zn | 0.7 |
| I-4 | HC-8 | 56 | Mg | 0.75 |
| I-7 | HC-3 | 53 | Zn | 5.0 |
| I-8 | HC-3 | 51 | Na | 4.5 |
| I-9 | HC-16 | 52 | Zn | 4.2 |
| I-10 | HC-15 | 58 | Zn | 5.3 |
| I-11 | HC-16 | 51 | Na | 4.5 |
| I-12 | HC-8 | 56 | Na | 0.93 |
| I-13 | HC-16 | 51 | Li | 2.6 |
| I-14 | HC-17 | 18 | Zn | 5.2 |
| I-15 | HC-13 | 55 | Na | 1.3 |
| I-16 | HC-18 | 68 | Zn | 1.1 |

Bimodal Ionomer Compositions

Suitable bimodal compositions are described at length in U.S. Pat. Nos. 6,562,906; 6,762,246; 7,037,967; 7,273,903; and 7,488,778; and in U.S. patent application Ser. No. 12/315,731, filed on Dec. 5, 2008. Briefly, however, suitable bimodal compositions comprise or are prepared from a high molecular weight copolymer and a low molecular weight copolymer. More specifically, suitable bimodal compositions comprise, consist essentially of, or are prepared from:

(a) an E/X/Y terpolymer, wherein E represents copolymerized units of ethylene, X represents copolymerized units of a $C_3$ to $C_8$ α,β-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da; and (b) an E/Z copolymer wherein E represents copolymerized units of ethylene and Z represents copolymerized units of acrylic acid or methacrylic acid, wherein the amount of Z is about 3 to about 25 weight % of the E/Z copolymer and wherein the weight average molecular weight (Mw) of the E/Z dipolymer is in the range of 2,000 to 30,000 Da.

Preferably, the high molecular weight terpolymer(s) (E/X/Y) are present in about 40 to about 95 weight %, based on the combined total weight of the high molecular weight terpolymer and the low molecular weight copolymer. Also preferably, the low molecular weight copolymer(s) (E/Z) are present in the range of about 5 to about 60 weight %, or about 5 to about 50 weight %, or about 5 to 25%, or about 5 to 20%, based on the total weight of the high and low molecular weight copolymers.

Preferably, at least 30% of the combined acid moieties in the high molecular weight terpolymers and low molecular weight copolymers are neutralized to the corresponding carboxylate salts. More preferably, the acid moieties of the high molecular weight terpolymers and low molecular weight copolymers in the bimodal ionomer are partially or fully neutralized to a level of about 40 to about 100%, or about 40 to about 85%, or about 40 to about 75%, or about 50 to about 90%, or about 50 to about 85%, or about 50 to about 75% or about 60 to about 80%, based on the total number of acid moieties in the high and low molecular weight copolymers.

Of note are bimodal compositions comprising or consisting essentially of (1) a high molecular weight copolymer component comprising an E/X/Y terpolymer, wherein X (e.g. methacrylic acid or acrylic acid) is from 5 to 20 weight % of the copolymer and Y (e.g. alkyl acrylate such as butyl acrylate) is from 10 to 45 weight % of the copolymer, and (2) the low molecular weight copolymer; wherein at least 30% of the combined acid groups of (1) and (2) are neutralized to zinc salts. Of particular note are E/X/Y terpolymers and ionomer compositions thereof wherein X is acrylic acid and Y is n-butyl acrylate, including a terpolymer with 6.2 weight % of acrylic acid and 28 weight % of n-butyl acrylate. Also of note are E/X/Y terpolymers and ionomer compositions thereof wherein X is methacrylic acid and Y is n-butyl acrylate, including a terpolymer with 9 weight % of methacrylic acid and 23 weight % of n-butyl acrylate.

The components of the bimodal ionomer composition may be combined by any suitable technique. Preferably, the non-neutralized high molecular weight terpolymers and low molecular weight copolymers are melt-blended and neutralized in situ so that desired higher or full neutralization may be achieved in one step. Alternatively, bimodal ionomer compositions may be made by melt blending a melt processible ionomer of a high molecular weight terpolymer with a low molecular weight copolymer or an ionomer thereof, and then optionally further neutralizing the resulting blend to achieve the desired nominal neutralization of the bimodal composition.

Neutralization may be effected by reacting the high and/or low molecular weight copolymers with a basic compound, such as a compound containing zinc cations, for example zinc oxide or zinc acetate. The basic compound(s) may be added neat to the acid copolymer(s) or ionomer(s) thereof, or pre-mixed with a polymeric material, such as an acid copolymer, to form a "masterbatch" that may be added to the acid copolymers or ionomers thereof.

Trimodal Ionomer Compositions

The trimodal ionomer compositions described herein have improved, higher melt flow with respect to the expected MI calculated according to formula (I), described above. Yet, they retain favorable properties such as good stiffness and melt strength. These trimodal ionomer compositions include two high molecular weight copolymers and a low molecular weight copolymer. They may, therefore, be considered as blends of a bimodal ionomer composition comprising a first ionomer composition, that is, the bimodal composition, with a second ionomer composition comprising a second high molecular weight copolymer.

More specifically, provided herein is a method of increasing the melt index of an ionomer composition. The method comprises the steps of combining the first ionomer composition with the second ionomer composition. Melt mixing is a preferred method of combining the ionomer compositions.

The first ionomer composition comprises (i) 70 to 95 weight %, based on the total weight of (i) and (ii), of an E/X/Y terpolymer; and (ii) 5 to 30 weight %, based on the total weight of (i) and (ii), of an E/Z copolymer. At least 30% of the combined carboxylic acid groups in the E/X/Y terpolymer and the E/Z copolymer are nominally neutralized to carboxylate salts comprising cations of a first element. The second ionomer composition comprises an E/W dipolymer. At least 35% of the carboxylic acid groups in the E/W dipolymer are nominally neutralized to carboxylate salts comprising cations of a second element that is different from the first element.

Combining the first ionomer composition with the second ionomer composition, based on the total weight of (i), (ii) and the second ionomer, provides a third ionomer composition. At least 35% of the combined acidic groups in the E/X/Y terpolymer, the E/W dipolymer and the E/Z dipolymer are nominally neutralized to carboxylate salts comprising a combination of zinc cations and cations of one or more elements selected from the group consisting of group IA elements and group IIA elements. In the trimodal compositions described herein, however, the group IA element is not sodium and the group IIA element is not magnesium, when X represents copolymerized units of acrylic acid and W represents copolymerized units of methacrylic acid in an amount greater than 12 weight % of the E/W copolymer.

The bimodal first ionomer composition may be combined with up to 75 weight %, preferably 5 to 75 weight %, more preferably 5 to 65 weight %, or still more preferably 20 to 60 weight %, of the second ionomer composition to form the trimodal composition.

Preferably, at least 5 equivalent %, at least 40 equivalent %, at least 50 equivalent %, or at least 75 equivalent % of the cations in the trimodal composition are zinc cations. Of note are trimodal compositions wherein the carboxylate salts comprise a combination of zinc and sodium, a combination of zinc and magnesium, or a combination of zinc and lithium.

Also preferably, the neutralization level of the trimodal ionomer composition is about 35 to about 90%, about 35 to about 75%, about 35 to 60%, or about 40 to 55%, based on the total number of carboxylic acid and carboxylate moieties in the trimodal ionomer composition.

Alternatively, the first ionomer composition and the second ionomer composition may initially have neutralization levels at which the compositions are tractable, that is, melt-processible. After mixing the first and second ionomer compositions, the neutralization level of the trimodal composition may be increased or decreased by any suitable method. See, for example, U.S. Patent Appln. Publn. No. 2007/10203277 A1.

Preferably, zinc-containing bimodal ionomer compositions are melt blended with a second ionomer, such as an ethylene methacrylic acid dipolymer wherein the methacrylic acid is from 2 to 30 weight % of the polymer and at least 35% of the acid moieties are neutralized to carboxylate salts comprising cations of group IA (alkali metal) elements, such as lithium, sodium or potassium, or group IIA (alkaline earth) elements, such as magnesium.

Also preferably, a bimodal ionomer composition wherein at least 35% of the acid moieties are neutralized to carboxylate salts comprising cations of group IA (alkali metal) elements or group IIA (alkaline earth) elements is melt blended with an ionomer of an ethylene methacrylic acid dipolymer. The amount of methacrylic acid in the ionomer is from 2 to 30 weight % of the dipolymer and at least 35% of the dipolymer's acid moieties are neutralized to form carboxylate salts having zinc cations.

Accordingly, of note is a method wherein a zinc-containing bimodal ionomer composition is mixed with a lithium-containing second ionomer. Also of note is a method wherein a zinc-containing bimodal ionomer composition is mixed with a second ionomer prepared from an E/W dipolymer wherein W is present in the E/W dipolymer in an amount of 12 weight % or less and the ionomer has carboxylate salts of sodium or magnesium. Further of note is a method wherein a bimodal ionomer composition with carboxylate salts containing cations of group IA elements and/or group IIA elements is mixed with a second ionomer composition with carboxylate salts containing zinc cations to provide a third ionomer composition. Finally, a method wherein the first ionomer composition consists essentially of E/X/Y and E/Z and the second ionomer composition consists essentially of E/W is also of note.

In addition, a third, trimodal ionomer composition produced by the method described herein comprises or consists essentially of:

(a) 20 to 80 weight %, based on the combination of (a), (b) and (c), of an E/X/Y terpolymer wherein E represents copolymerized units of ethylene, X represents copolymerized units of a $C_3$ to $C_8$ $\alpha,\beta$-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da;

(b) 5 to 75 weight %, based on the combination of (a), (b) and (c), of an E/W dipolymer wherein E represents copolymerized units of ethylene and W represents copolymerized units of acrylic acid or methacrylic acid, wherein the amount of W is about 3 to about 25 weight % of the E/W dipolymer and wherein the weight average molecular weight (Mw) of the E/W dipolymer is in the range of 80,000 to 500,000 Da; and (c) 2 to 20 weight %, based on the combination of (a), (b) and (c), of an E/Z copolymer wherein E represents copolymerized units of ethylene and Z represents copolymerized units of acrylic acid or methacrylic acid, wherein the amount of Z is about 3 to about 25 weight % of the E/Z copolymer and wherein the weight average molecular weight (Mw) of the E/Z dipolymer is in the range of 2,000 to 30,000 Da; wherein at least 35% of the combined acidic groups in the E/X/Y terpolymer, the E/W dipolymer and the E/Z dipolymer are nominally neutralized to carboxylate salts comprising a combination of zinc cations and cations of one or more elements selected from the group consisting of group IA elements and group IIA elements; provided that when X represents copolymerized units of acrylic acid and W represents copolymerized units of methacrylic acid, in an amount greater than 12 weight % of the E/W copolymer, the group IA element is other than sodium and the group IIA element is other than magnesium. The suitable and preferred amounts of E/X/Y, E/Z and E/W; Mw and comonomer compositions of E/X/Y, E/Z and E/W; and cations and neutralization levels of the trimodal composition are as described above with respect to the methods provided herein.

Although this third, trimodal ionomer composition may be prepared by the methods described above, it may also be prepared by mixing the individual components simultaneously. Alternatively, it may be prepared by mixing subcombinations of the trimodal ionomer composition in a different sequence. For example, an E/X/Y zinc ionomer may be blended with a combination of E/Z low molecular weight copolymer and E/W high molecular weight dipolymer not containing zinc and further neutralized with non-zinc containing basic compounds. Alternatively, a mixture of E/X/Y and E/W high molecular weight copolymers and a low molecular weight copolymer may be blended and neutralized with a combination of zinc-containing and non-zinc-containing basic compounds, either sequentially or concurrently. Other methods of preparation are also envisioned, such that the mixed ion trimodal ionomer composition is as described above.

Further provided herein is a method of providing a trimodal ionomer composition having an increased melt index. The method comprises the steps of providing (a) 20 to 80 weight %, based on the combination of (a), (b) and (c), of an E/X/Y terpolymer;

(b) 5 to 75 weight %, based on the combination of (a), (b) and (c), of an E/W dipolymer; and (c) 2 to 20 weight %, based on the combination of (a), (b) and (c), of an E/Z copolymer. The method further comprises the steps of combining the E/X/Y terpolymer, the E/W dipolymer and the E/Z dipolymer and neutralizing at least about 35% of the combined acidic groups in the E/X/Y terpolymer, the E/W dipolymer and the E/Z dipolymer to form carboxylate salts. The carboxylate salts comprise a combination of zinc cations and cations of one or more elements selected from the group consisting of group IA elements and group IIA elements, provided that when X represents copolymerized units of acrylic acid and W represents copolymerized units of methacrylic acid, in an amount greater than 12 weight % of the E/W copolymer, the group IA element is other than sodium and the group IIA element is other than magnesium.

Trimodal ionomer compositions comprising this combination of cations have a melt index that is higher than the melt index of trimodal ionomer compositions having the same proportions of the same E/X/Y terpolymer, E/W dipolymer and E/Z dipolymer and neutralized to the same extent to form carboxylate salts comprising cations that consist essentially of one element. The neutralization may take place prior to, simultaneously with, or after the E/X/Y terpolymer, the E/W dipolymer and the E/Z dipolymer are combined. The E/X/Y terpolymer, the E/W dipolymer and the E/Z dipolymer may be fully or partially neutralized before they are combined, and the overall neutralization level may be titrated into the desired range during or after the combination step. The suitable and preferred methods of combining the polymers; amounts of E/X/Y, E/Z and E/W; Mw and comonomer compositions of E/X/Y, E/Z and E/W; and cations and neutralization levels of the trimodal composition are as described above with respect to the methods provided herein.

Additives

The bimodal and trimodal compositions may further comprise small amounts of one or more materials commonly used and well known in the polymer art. These optional materials include conventional additives such as plasticizers; stabilizers, including viscosity stabilizers and hydrolytic stabilizers; primary and secondary antioxidants, such as IRGANOX™ 1010; ultraviolet ray absorbers and stabilizers; anti-static agents; dyes; pigments or other coloring agents; fire-retardants; lubricants; processing aids; slip additives; antiblock agents, such as silica or talc; release agents; inorganic fillers; $TiO_2$ or other whitening agents; optical brighteners; surfactants; and combinations of two or more optional materials. Many suitable additives are described in the *Kirk Othmer Encyclopedia of Chemical Technology*, $5^{th}$ edition, John Wiley & Sons (Hoboken, 2005).

These optional additives may be present in the bimodal and trimodal compositions in quantities that generally range from 0.01 to 15 weight %, preferably from 0.01 to 5 weight % or 0.01 to 10 weight %, based on the total weight of the trimodal composition. At these levels, the additives are not believed to detract from the basic and novel characteristics of the trimodal composition or to affect the performance of the trimodal composition significantly or adversely.

The incorporation of the optional materials into the compositions may be carried out by any suitable process, for example, by dry blending, by extruding a mixture of the various constituents, by the conventional masterbatch technique, or the like. See again the *Kirk Othmer Encyclopedia*.

After melt mixing the components to prepare the third ionomer composition according to the methods described above and to incorporate the additives, if any, the trimodal ionomer composition may be further processed. In particular, the method described herein further comprises the steps of processing the trimodal ionomer composition in a molten state into a shaped trimodal composition; and allowing the shaped trimodal composition to cool to provide a shaped article. In some cases, the trimodal composition may be melt mixed and further processed into a finished shaped article, such as a sphere, a container, or a molded part. In other cases, the composition may be processed into intermediate shaped articles (such as pellets, slugs, rods, ropes, sheets and the like) that may be further transformed by one or more additional processes into finished shaped articles. Suitable additional processes include, without limitation, extrusion, injection molding, compression molding, overmolding, profile extrusion, lamination, coextrusion, extrusion coating, and the like.

Applications and End Uses

The mixed ion trimodal ionomer composition may be used to prepare shaped articles, for example as an alternative to a previously known bimodal ionomer compositions. The trimodal composition may be formed into shapes by, for example, injection molding (i.e. extrusion of the molten composition into molds, followed by cooling, the molds being in a configuration to produce an article comprising the composition in a desired shape). Sheets or films of the trimodal composition may be produced by extrusion through a laminar die or annular and processing the composition by, for example, cast sheet or film extrusion, blown film extrusion, extrusion coating or lamination techniques well know in the polymer processing art.

The mixed ion trimodal ionomer compositions may also be used to form multilayer structures in which at least one layer comprises the mixed ion trimodal ionomer composition.

Other layers of the multilayer structures may include polymeric materials including thermoplastic compositions other than the mixed ion trimodal ionomer composition, and thermoset compositions. The trimodal ionomer composition may be applied as a surface coating to various substrates. Substrates may be independently selected from the group consisting of thermoplastic film and sheet, cellular foams, woven, knitted and non-woven fabrics, paper, pulp and paperboard products, wood and wood products, metal, glass, stone, ceramic, and leather and leather-like products, thermoplastic resins, and thermoset resins. The trimodal ionomer composition may also be a substrate to which other materials are adhered.

The mixed ion trimodal ionomer is particularly useful for preparing articles using processes where higher melt flow is desirable, such as injection molding or thin-gauge coating applications. The benefits of using a bimodal ionomer modified with an additional ionomer (i.e. a mixed ion trimodal ionomer) in these processes include faster molding cycles, better gauge control, the ability to use a higher number of mold cavities to enhance productivity, more intricate and complex mold design, and lower processing temperature to save energy and costs.

In injection molding, the molten trimodal ionomer composition is forced into the mold tooling of an injection-molding machine. The mold tooling when closed defines a cavity in which the interior walls of the mold tooling define the shape of the final molded piece. A sprue through which the injection molding material is injected is also present in the mold tooling. When the heated trimodal modified ionomer composition is injected under pressure by the injection-molding machine, the molding material flows in through the sprue and fills the cavity. The shaped trimodal ionomer composition is then allowed to cool. Upon completion of the molding process, the mold tooling is opened and the finished shaped article is ejected.

For example, molded articles that may comprise or be produced from mixed ion trimodal ionomer compositions include golf balls wherein at least one layer of the golf ball comprises the mixed ion trimodal ionomer composition described herein. A golf ball be a one-piece ball or may comprise a cover (the outermost layer), a core (the innermost layer) and optionally at least one intermediate layer between the cover and the core. Such golf balls include golf balls in which the cover comprises the mixed ion trimodal ionomer, golf balls in which the core comprises the mixed ion trimodal ionomer, or golf balls in which at least one intermediate layer between the cover and the core comprises the mixed ion trimodal ionomer. In some cases, more than one layer of the golf ball may comprise a mixed ion trimodal ionomer. Preferably, a mixed ion trimodal ionomer is present in the cover and/or an intermediate layer of the golf ball. The golf balls may be prepared according to methods described in U.S. Pat. Nos. 6,562,906; 6,762,246 and 7,037,967 and U.S. patent application Ser. No. 11/101,078. Additional details of golf ball construction may be found in U.S. application Ser. No. 11/789,831 (US Publication No 2007/0203277), U.S. application Ser. No. 12/215,764 and U.S. application Ser. No. 12/261,331.

Other shaped articles, such as containers, closures, and films are useful for packaging goods such as foodstuffs, cosmetics, health and personal care products, pharmaceutical products and the like, may comprise or be produced from the trimodal ionomer compositions.

Containers include trays, cups, cans, buckets, tubs, boxes, bowls, bottles, vials, jars, tubes, and the like. A container may be useful for packaging liquids such as water, milk, and other beverages. Alternatively, it may contain medicines, pharmaceuticals or personal care products. Other liquids that may be packaged in bottles include foods such as edible oils, syrups, sauces, and purees such as baby foods. Powders, granules and other flowable solids may also be packaged in bottles.

Injection molded hollow articles suitable as bottle preforms are also examples of molded articles. Examples of blow-molded articles include containers such as blown bottles. In the bottle and container industry, the blow molding of injection-molded preforms has gained wide acceptance. An outside layer comprising the mixed ion trimodal ionomer composition provides a soft feel and scratch resistance to bottles.

Injection molding a bottle preform may be conducted by transporting a molten material of the various layers into a mold and allowing the molten materials to cool. The molding provides an article that is substantially a tube with an open end and a closed end encompassing a hollow volume. The open end provides the neck of the bottle and the closed end provides the base of the bottle after subsequent blow molding. The molding may be such that various flanges and protrusions at the open end provide strengthening ribs and/or closure means, for example screw threads for a cap. For a multilayer preform molding, the molten materials may be injected into the mold from an annular die such that they form a laminar flow of concentric layers. The molten materials are introduced into the mold such that the material for the outside trimodal ionomer layer and the inside layer enter the mold cavity before the material for the inner layer(s) enters and form a leading edge of the laminar flow through the cavity. For a period of time, the layers enter the mold cavity in a layered concentric laminar flow. Next, flow of the material for the inner layer(s) is halted and the material for the outside and inside layers provides a trailing edge of the laminar flow. The flow continues until the entire cavity is filled and the trailing edge seals or fuses to itself to form the closed end of the preform.

To prepare a bottle, the preform may be reheated and biaxially expanded by simultaneous axial stretching and blowing in a shaped mold so that it assumes the desired shape. The neck region is not affected by the blow molding operation while the bottom and particularly the walls of the preform are stretched and thinned.

Other examples of molded articles include injection molded or compression molded caps or closures for containers. Most containers have closures or caps to adequately seal the contents of a container against leakage from or into the container. In many instances, the cap is designed for repeated removal and replacement as the consumer accesses the contents of the container. A surface layer of the mixed ion trimodal ionomer provides a soft feel for such caps and closures.

Closures or caps may be prepared by injection molding or compression molding. A cap may consist of a top and a depending skirt that close around the neck of the container. Caps may comprise continuous or discontinuous threads that provide screw closures to the container and/or snap closures. They may also incorporate dispensing features, tamper-evidence features and child resistant features. Other decorative or functional features may also be present. They may also include combinations with other materials (e.g., caps having metal lid portions or portions utilizing plastic materials other than a trimodal ionomer). Linerless caps may be molded from a trimodal ionomer composition. Alternatively, caps may have a separate liner that is inserted into the shell of the cap. A liner may be compression molded into the shell of the cap. Other closures include plastic stoppers or "corks" that are inserted into the opening of a container such as a wine bottle or perfume bottle.

The compositions may also be shaped by profile extrusion. A profile is defined by having a particular shape and by its process of manufacture is known as profile extrusion. A profile is not film or sheeting, and thus the process for making profiles does not include the use of calendering or chill rolls, nor is it prepared by injection molding processes. A profile is fabricated by melt extrusion processes that begin by (co) extruding a thermoplastic melt through an orifice of a die (annular die with a mandrel) forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. A common shape of a profile is tubing or hoses. Monolayer or multilayer tubing may be prepared.

Films and powders comprising the mixed ion trimodal ionomer composition may be prepared and used according to methods described in U.S. patent application Ser. No. 12/313,101. These methods are useful in preparing articles with a surface layer of the trimodal ionomer composition, such as fabrics (woven or nonwoven) coated with the trimodal ionomer composition.

EXAMPLES

The following Examples are provided to describe the invention in further detail. These Examples, which set forth a preferred mode presently contemplated for carrying out the invention, are intended to illustrate and not to limit the invention.

Bimodal ionomer compositions in Table 1 may be prepared on a single screw or 28-mm twin screw extruder by blending the indicated materials and neutralizing to the indicated level using ZnO and/or zinc acetate as neutralizing agents. The abbreviations used in these Examples for high molecular weight copolymers are identified in Table A, those for low molecular weight copolymers in Table B, and those for ionomers in Table C, above.

TABLE 1

| Bimodal ionomers | | | | |
| --- | --- | --- | --- | --- |
| High Mw Copolymer (weight %) | Low Mw Copolymer (weight %) | Nominal Neutralization Level (%) | MI (g/10 min) | Moisture, ppm |
| BMI-1 HC-3 (90) | LC-2 (10) | 70% | 2.5 | NA |
| BMI-2 HC-3 (90) | LC-2 (10) | 67% | 3.73 | NA |
| BMI-3 HC-3 (90) | LC-2 (10) | 67% | 3.5 | 309 |

BMI-1 and BMI-2 were prepared using a one-step process in which HC-3, LC-2, zinc acetate dihydrate and zinc oxide were all fed into the rear feed hopper of a twin-screw extruder. BMI-3 was prepared using a two-step process in which HC-3, LC-2 and zinc acetate dihydrate were first melt mixed in a twin-screw extruder. ZnO was then added to the initial product in a second-step melt mixing/neutralization process through a twin screw extruder to provide the final nominal neutralization level. After melt-mixing in the extruder, the compositions were strand-cut into pellets.

The BMI compositions were blended with a second ionomer and the melt indices were determined, as summarized in Table 2. Pellets of the BMI and the additional ionomers were fed into an extruder and melt blended using conventional techniques. The resulting compositions were strand-cut into pellets and/or processed into articles for testing their properties. Also included in Table 2 is the expected MI, calculated according to formula (I), above.

Compositions in which a zinc-containing BMI was mixed with an additional zinc-containing ionomer (I-3, I-9 and I-10) did not exhibit unexpected melt index increases. Most of these all-zinc compositions had an actual MI that was lower than the expected MI for each of the blends, even when the MI of the second ionomer was greater than that of the original BMI. Surprisingly, when the zinc-containing BMI was mixed with a lithium-containing ionomer (I-13), the actual melt index of the blend increased significantly over the expected MI (2-fold or more). In some cases, the MI of the mixed ion trimodal ionomer blend was at least 3 times that of the original bimodal blend. Even more surprisingly, the actual MI of each mixed ion trimodal ionomer was greater than the MI of both the BMI and the second ionomer. In Examples 18 to 21, the zinc-containing BMI was mixed with a low acid dipolymer having sodium carboxylate salts, and a significant increase in the melt index was also observed.

dal ionomers, i.e. BMI-6 or BMI-7, and the conventional ionomers, i.e. Ionomer I-1 or Ionomer I-2. The resulting compositions and their physical properties are summarized in Table 4. Inspection of the results in Table 4 shows that the trimodal ionomers with a combination of Mg and Na cations did not exhibit an unexpected increase in melt index.

In addition, fifty parts of BMI-6 is melt blended with fifty parts of Ionomer I-9 to prepare a Zn/Mg mixed ion trimodal ionomer composition (Example 37).

TABLE 4

| Example | C32 | C33 | C34 | C36 | 37 |
|---|---|---|---|---|---|
| BMI-6, weight % | 100 | 50 | — | — | 50 |
| BMI-7, weight % | — | 50 | 50 | 100 | — |

TABLE 2

| Example | BMI | Second ionomer | Blend Ratio BMI/second ionomer | Moisture ppm | BMI | Second ionomer | MI Blend (Actual) | Blend (Expected) |
|---|---|---|---|---|---|---|---|---|
| C1 | BMI-1 | I-3 | 85/15 | NA | 2.5 | 0.7 | 1 | 2.07 |
| C2 | BMI-1 | I-3 | 75/25 | NA | 2.5 | 0.7 | 1.9 | 1.82 |
| 3 | BMI-1 | I-12 | 85/15 | NA | 2.5 | 0.93 | 11.1 | 2.16 |
| 4 | BMI-1 | I-12 | 75/25 | NA | 2.5 | 0.93 | 7.2 | 1.95 |
| C5 | BMI-2 | I-9 | 85/15 | NA | 3.73 | 4.2 | 1.31 | 3.79 |
| C6 | BMI-2 | I-9 | 75/25 | NA | 3.73 | 4.2 | 1.53 | 3.84 |
| 7 | BMI-2 | I-11 | 85/15 | NA | 3.73 | 4.5 | 12.3 | 3.84 |
| 8 | BMI-2 | I-11 | 75/25 | NA | 3.73 | 4.5 | 11.4 | 3.91 |
| C9 | BMI-2 | I-10 | 85/15 | NA | 3.73 | 5.3 | 1.3 | 3.93 |
| C10 | BMI-2 | I-10 | 75/25 | NA | 3.73 | 5.3 | 1.2 | 4.07 |
| 11 | BM1-3 | I-13 | 75/25 | NA | 3.5 | 2.6 | 11 | 3.25 |
| 12 | BMI-3 | I-13 | 50/50 | NA | 3.5 | 2.6 | 8 | 3.02 |
| 13 | BMI-3 | I-4 | 75/25 | 860 | 3.5 | 0.75 | 9.3 | 2.38 |
| 14 | BMI-3 | I-4 | 50/50 | NA | 3.5 | 0.75 | 5 | 1.62 |
| 15 | BMI-3 | I-4 | 90/10 | 384 | 3.5 | 0.75 | 8.4 | 3.00 |
| 16 | BMI-3 | I-4 | 80/20 | 779 | 3.5 | 0.75 | 10.1 | 2.57 |
| 17 | BMI-3 | I-4 | 70/30 | 571 | 3.5 | 0.75 | 6.2 | 2.20 |
| 18 | BMI-2 | I-15 | 65/35 | NA | 3.73 | 1.3 | 7 | 2.58 |
| 19 | BMI-2 | I-15 | 50/50 | NA | 3.73 | 1.3 | 4.2 | 2.20 |
| 20 | BMI-2 | I-15 | 35/65 | NA | 3.73 | 1.3 | 2.4 | 1.88 |
| 21 | BMI-2 | I-13 | 75/25 | NA | 3.73 | 2.6 | NA | 3.41 |
| 22 | BMI-2 | I-13 | 60/40 | NA | 3.73 | 2.6 | NA | 3.23 |
| 23 | BMI-2 | I-13 | 50/50 | NA | 3.73 | 2.6 | NA | 3.11 |
| 24 | BMI-2 | I-13 | 40/60 | NA | 3.73 | 2.6 | NA | 3.00 |
| 25 | BMI-2 | I-13 | 25/75 | NA | 3.73 | 2.6 | NA | 2.85 |

TABLE 3

| Example | BMI | Second ionomer | Additional ionomer | Blend Ratio BMI/second ionomer/ additional ionomer | Moisture ppm | BMI | Second ionomer | Additional ionomer | MI Blend (Actual) | Blend (Expected) |
|---|---|---|---|---|---|---|---|---|---|---|
| 26 | BMI-3 | I-4 | I-9 | 50/25/25 | 913 | 3.5 | 0.75 | 4.2 | 9.2 | 2.49 |

A pellet blend of 90 weight % of Ionomer I-1 and 10 weight % of LC-3 was melt blended and neutralized with a concentrate of Mg(OH)$_2$ in HC-3 (50:50 by weight) to a nominal neutralization level of 70% in a twin screw extruder to prepare bimodal ionomer BMI-6. A pellet blend of 90 weight % of Ionomer I-2 and 10 weight % of LC-4 was melt blended and neutralized with a Na$_2$CO$_3$ concentrate to a nominal neutralization level of 60% in a twin screw extruder to prepare bimodal ionomer BMI-7, Blends were then prepared by melt blending on a twin screw extruder at 50:50 ratio of the bimo- TABLE 4-continued

| Example | C32 | C33 | C34 | C36 | 37 |
|---|---|---|---|---|---|
| I-1, weight % | — | — | — | 50 | — |
| I-2, weight % | — | — | — | — | — |
| I-9, weight % | — | — | — | — | 50 |

TABLE 4-continued

| Example | C32 | C33 | C34 | C36 | 37 |
|---|---|---|---|---|---|
| High Mw Terpolymer/weight % | HC-1/90 | HC-1/45 | HC-1/50 | 0 | HC-1/45 |
| High Mw Dipolymer/weight % | 0 | HC-14/45 | HC-14/45 | HC-14/90 | HC-16/50 |
| Low Mw copolymer/weight % | LC-3/10 | LC-3/5 LC-4/5 | LC-4/5 | LC-4/10 | LC-3/5 |
| Cation/Neutralization level | Mg/70 | Mg/Na/65 | Mg/Na/55 | Na/60 | Zn/Mg/61 |
| MI (expected) | — | 0.77 | 0.81 | — | 2.05 |
| MI (actual) | about 1 | 0.6 | 0.6 | 0.6 | NA |

HC-1 was also partially neutralized (about 51%) with ZnO concentrate on a single screw extruder and subsequently blended with LC-2 at 85:15 ratio to provide the zinc-containing BMI-8, with MI of 0.77. Subsequently, BMI-8 is melt-blended with ionomers I-3, I-4, I-12 and I-13 as summarized in Table 5.

TABLE 5

| Example | C38 | C39 | 40 | 41 | 42 |
|---|---|---|---|---|---|
| BMI-8, weight % | 100 | 50 | 50 | 50 | 50 |
| I-3, weight % | — | 50 | — | — | — |
| I-4, weight % | — | — | 50 | — | — |
| I-12, weight % | — | — | — | 50 | — |
| I-13, weight % | — | — | — | — | 50 |
| High Mw Terpolymer/weight % | HC-1/85 | HC-1/42.5 | HC-1/42.5 | HC-1/42.5 | HC-1/42.5 |
| High Mw Dipolymer/weight % | 0 | HC-8/50 | HC-8/50 | HC-8/50 | HC-16/50 |
| Low Mw copolymer/weight % | LC-2/15 | LC-2/7.5 | LC-2/7.5 | LC-2/7.5 | LC-2/7.5 |
| Cation/Neutralization level | Zn/51 | Zn/54 | Zn/Mg/54 | Zn/Na/54 | Zn/Li/51 |
| MI (expected) | — | 0.73 | 0.76 | 0.85 | 1.41 |
| MI (actual) | 0.77 | NA | NA | NA | NA |

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A composition consisting essentially of (a) 20 to 80 weight %, based on the combination of (a), (b) and (c), of an E/X/Y terpolymer wherein E represents copolymerized units of ethylene, X represents copolymerized units of a $C_3$ to $C_8$ α,β-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da;

(b) 5 to 75 weight %, based on the combination of (a), (b) and (c), of an E/W dipolymer wherein E represents copolymerized units of ethylene and W represents copolymerized units of acrylic acid or methacrylic acid, wherein the amount of W is about 3 to about 25 weight % of the E/W dipolymer and wherein the weight average molecular weight (Mw) of the E/W dipolymer is in the range of 80,000 to 500,000 Da; and (c) 2 to 20 weight %, based on the combination of (a), (b) and (c), of an E/Z copolymers wherein E represents copolymerized units of ethylene and Z represents copolymerized units of acrylic acid or methacrylic acid, wherein the amount of Z is about 3 to about 25 weight % of the E/Z copolymer and wherein the weight average molecular weight (Mw) of the E/Z dipolymer is in the range of 2,000 to 30,000 Da; wherein at least 35% of the combined acidic groups in the E/X/Y terpolymer, the E/W dipolymer and the E/Z dipolymer are nominally neutralized to carboxylate salts comprising a combination of zinc cations and cations of one or more elements selected from the group consisting of group IA elements and group IIA elements; provided that when X represents copolymerized units of acrylic acid and W represents copolymerized units of methacrylic acid, in an amount greater than 12 weight % of the E/W copolymer, the group IA element is other than sodium and the group IIA element is other than magnesium; wherein the composition has a higher melt index compared to a similar ionomer composition consisting essentially of the corresponding high molecular weight acid terpolymer, high molecular weight acid dipolymer and low molecular weight acid copolymer containing carboxylate salts with cations of a single element.

2. The composition of claim 1 wherein the amount of X is from 5 to 20 weight % of the E/X/Y terpolymer and the amount of Y is from 10 to 45 weight % of the E/X/Y terpolymer.

3. The composition of claim 2 wherein X represents copolymerized units of acrylic acid or methacrylic acid and Y represents copolymerized units of an alkyl acrylate.

4. The composition of claim 3 wherein Y represents copolymerized units of n-butyl acrylate.

5. The composition of claim 1 wherein W represents copolymerized units of methacrylic acid.

6. A method of providing a trimodal ionomer composition having an increased melt index compared to a similar ionomer composition consisting essentially of the corresponding high molecular weight acid terpolymer, high molecular weight acid dipolymer and low molecular weight acid copolymer containing carboxylate salts with cations of a single element, said method comprising the steps of providing (a) 20 to 80 weight %, based on the combination of (a), (b) and (c), of an E/X/Y terpolymer wherein E represents copolymerized units of ethylene, X represents copolymerized units of a $C_3$ to $C_8$ α,β-ethylenically unsaturated carboxylic acid, and Y represents copolymerized units of a softening comonomer selected from the group consisting of vinyl acetate, alkyl acrylate and alkyl methacrylate, wherein the alkyl groups have from 1 to 8 carbon atoms, wherein the amount of X is from about 2 to about 30 weight % of the E/X/Y terpolymer, and the amount of Y is from 3 to about 45 weight % of the E/X/Y terpolymer, and wherein the weight average molecular weight (Mw) of the E/X/Y terpolymer is in the range of 80,000 to 500,000 Da;

(b) 5 to 75 weight %, based on the combination of (a), (b) and (c), of an E/W dipolymer wherein E represents copolymerized units of ethylene and W represents copolymerized units of acrylic acid or methacrylic acid, wherein the amount of W is about 3 to about 25 weight % of the E/W dipolymer and wherein the weight average molecular weight (Mw) of the E/W dipolymer is in the range of 80,000 to 500,000 Da; and (c) 2 to 20 weight %, based on the combination of (a), (b) and (c), of an E/Z copolymer wherein E represents copolymerized units of ethylene and Z represents copolymerized units of acrylic acid or methacrylic acid, wherein the amount of Z is about 3 to about 25 weight % of the E/Z copolymer and wherein the weight average molecular weight (Mw) of the E/Z dipolymer is in the range of 2,000 to 30,000 Da;

combining the E/X/Y terpolymer, the E/W dipolymer, and the E/Z dipolymer; and neutralizing at least 35% of the combined acidic groups in the E/X/Y terpolymer, the E/W dipolymer and the E/Z dipolymer to form carboxylate salts comprising a combination of zinc cations and cations of one or more elements selected from the group consisting of group IA elements and group IIA elements; provided that when X represents copolymerized units of acrylic acid and W represents copolymerized units of methacrylic acid, in an amount greater than 12 weight % of the E/W copolymer, the group IA element is other than sodium and the group IIA element is other than magnesium.

7. The method of claim 6 wherein the amount of X is from 5 to 20 weight % of the E/X/Y terpolymer and the amount of Y is from 10 to 45 weight % of the E/X/Y terpolymer.

8. The method of claim 6 wherein Y represents copolymerized units of n-butyl acrylate.

9. The method of claim 6 wherein X represents copolymerized units of acrylic acid or methacrylic acid.

10. The method of claim 6 wherein W represents copolymerized units of methacrylic acid.

* * * * *